(12) United States Patent
Evans et al.

(10) Patent No.: US 6,826,746 B2
(45) Date of Patent: Nov. 30, 2004

(54) DEBUGGER PROBE FOR OBJECT ORIENTED PROGRAMMING

(75) Inventors: David H. Evans, Lexington, KY (US); Christopher James Gay, Lexington, KY (US); Anthony Paul Scherk, Midway, KY (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 09/801,589

(22) Filed: Mar. 8, 2001

(65) Prior Publication Data

US 2002/0129337 A1 Sep. 12, 2002

(51) Int. Cl.⁷ .................................................. G06F 9/44
(52) U.S. Cl. ....................................... 717/124; 717/163
(58) Field of Search .............................. 717/124, 163, 717/118, 129, 138

(56) References Cited

U.S. PATENT DOCUMENTS

| | | | |
|---|---|---|---|
| 5,548,717 A | 8/1996 | Wooldridge et al. | 395/183 |
| 5,706,502 A | 1/1998 | Foley et al. | 395/610 |
| 5,901,315 A | 5/1999 | Edwards et al. | 395/704 |
| 6,061,518 A | 5/2000 | Hoffman | 395/704 |
| 2002/0073063 A1 * | 6/2002 | Faraj | 707/1 |

OTHER PUBLICATIONS

"Java Platform Debugger Architecture—Documentation JPDA 1.0", Sun Inc. Document [On line] retrieve from <http://java.sun.com/products/jpda/doc/1.0.html> Feb. 9, 2004, 78 pages.*

"Java 2 Platform, Standard Edition, v1.3.1 API specification, Index B, G, I, O".*

"May 1998 Java News", 7 pages.*

Sun Inc, "Birds of a Feather", JavaOne, 44 pages.*

"Java [™] Platform Debugger Architecture Java [™] Virtual Machine Debug Interface Reference", published online by Sun Microsystems, Feb. 2, 2001, at http://java.sun.com/products/jpda/doc/jvmdi—spec.html, 78 pages.

* cited by examiner

Primary Examiner—Wei Zhen
Assistant Examiner—Kuo-Liang J. Tang
(74) Attorney, Agent, or Firm—Robert H. Frantz; David A. Mims, Jr.

(57) ABSTRACT

An improved source-level debugger for object-oriented application programs which may include linked native language dynamic load libraries. The debugger is compatible with the Java Platform Debugger Architecture ("JPDA"), and provides new capabilities such as patching of Java variables and reading and writing strings from and to the application under test and being run by a local or remote Java Virtual Machine.

37 Claims, 15 Drawing Sheets

DEBUGGER PROBE FOR OBJECT ORIENTED PROGRAMMING

BACKGROUND OF THE INVENTION

1. Field of the Invention

The present invention relates generally to computer software development tools and more particularly to a method and system for debugging a Java application that includes native method dynamic load libraries (e.g., C or C++ code).

2. Description of the Related Art

Traditional programming methodologies are organized around actions and logic. Programs developed using traditional software design methodologies are usually easily represented by flow diagrams and could be viewed as a procedure of steps which receive input, processes the data, and produces output.

Object Oriented Programming ("OOP"), however, is organized around objects and data. OOP approaches programming from a perspective centralized on providing objects, each object having an interface through which it may be used or by other programs and objects to perform a "method" or set of methods.

One of the earliest object-oriented computer languages was Smalltalk[™]. More recent and perhaps more widely used object-oriented languages are C++ and Java.

The Java programming language is especially adapted for use in distributed applications, such as on corporate networks and the Internet. Additionally, Java applications have found extensive use on the World Wide Web.

Java developers often "extend" a Java application by linking their own Java code with native method dynamic load libraries ("DLL"). A "native method" DLL is usually a function written in another programming language, such as "C" or "C++", which is not portable across different operating platforms without recompilation.

When the Java application includes linked native method DLL's, a problem arises in debugging the application. In particular, while "tools" for debugging Java code, on the one hand, and tools for debugging C/C++ code, on the other hand, are well-known, the art lacked the ability to simultaneously debug a piece of software that included both types of code.

As a result, some available methods addressed the problem of debugging Java applications having linked native method DLL's by using a "brute force" approach by using distinct debug routines that are run separately. This approach required the Java application with the linked native language DLL's to be executed twice, one for each debug routine, thereby substantially increasing the time necessary to debug the Java application.

The system and method disclosed in U.S. Pat. No. 5,901,315 to Edwards, et al., provided a solution to this problem at the time of its availability and in keeping with currently available companion Java development tools. This system and method provided for debugging a target application which comprised Java code having linked native method DLL's which was carried out in a computer having an operating system, a system debug application programming interface ("API"), and a Java virtual machine ("JVM") having a Java debug API.

According to the Edwards system and method, the JVM was first launched under the system debug API, and the Java application was then run under the JVM. Because the JVM that runs the target application itself runs under the system debug API, simultaneous control of the target application via the system debug API and the Java debug API was enabled. Thus, the method allowed the debug of the target application by simultaneously debugging the Java code and the native method dynamic load libraries. Events generated during the debug process were characterized as being initiated from the Java code or the native method DLL's, as the case may be. The preferred embodiment of the Edwards debugger comprised a graphical user interface ("GUI") front end, a debug engine back end, and a "probe" or daemon. The GUI provided an interface through which the user made requests and viewed the status of the application being debugged. The debug engine performed the debugging work by controlling the probe to manipulate the target application through the JVM, and to report events to the debug engine.

The probe was preferably implemented as two distinct processes, a first "daemon" process that performed native method debugging, and a second "probe" process that performed the Java method debugging. The first process also preferably controlled the second process across the system debug API and communicated therewith via a socket connection to facilitate the simultaneous debugging of the Java and C/C++ code comprising the target application.

According to another feature of the Edwards method, the front and back end components of the debugger were supported on a first computer, while the first and second "processes" were supported on a second computer. The first and second computers could then be connected over a computer network such as a TCP/IP connection to facilitate remote debugging of the target application. The Edwards system and method was implemented in a programming tool product from International Business Machines ("IBM") under the name Interactive Code Analysis Tool ("ICAT").

The current ICAT for Java utilizes a GUI to permit source-level debugging of Java applications on Microsoft's Windows[™] NT 4.0 and Windows2000. Using ICAT, application developers can set breakpoints, execute and step their applications, and examine the application's stack and variables all with the click of a mouse. If desired, the debugger can be operated remotely; that is, ICAT resides on one system, and the probe resides on the system containing the application. Communication between the two systems is via a TCP/IP connection. The ICAT probe is written in Java, and it interacts with the JVM as needed to control the application being debugged. Essentially, ICAT starts a Windows process, which is the JVM running the probe. ICAT then communicates with the probe via TCP/IP. If ICAT is being run remotely, a daemon is run on the target system which interacts with the probe.

For versions of the JVM before version 1.3, the ICAT probe utilized Sun Microsystems' sun.tools.debug Application Programming Interface ("API") in order to control the application being debugged. The sun.tools.debug API is easy to use, but it is missing a number of functions that the ICAT customarily provided for other debuggers for other programming languages.

Beginning with version 1.3 of the JVM, several new debugger interfaces were provided. Further, support for the sun.tools.debug API was no longer supported. The new Sun product is called the "Java Platform Debugger Architecture" ("JPDA"), and it has three components:

(1) the Java Virtual Machine Debugging Interface ("JVMDI"), which is a low-level native interface which defines what support a JVM must provide in order to allow an application to be debugged;

(2) the Java Debug Wire Protocol (JDWP), which allows communication between a debugger virtual machine and a target virtual machine; and (3) the Java Debug Interface (JDI), which is a high-level interface, which uses JDWP and JVMDI.

New JPDA features include the ability to exclude classes while stepping, modify Java variables, use deferred breakpoints, create watchpoints, display thread names, attach to running processes, and set breakpoints at arbitrary bytecode addresses. JPDA also allows for capturing output from applications for display by the debugger and permits sending input from the debugger to applications. Further, JPDA is believed to be more stable than the sun.tools.debug API.

There are some known disadvantages to using JPDA. Many functions that the probe performs are more complicated to implement with JPDA, especially exception filtering. Also, the ICAT function which allows users to load classes is not officially supported in JPDA.

In as much as the existing ICAT does not support JPDA, and whereas JPDA provides improved functionality and stability for Java application program development, testing, and debugging, there is a need in the art for a system and method such as ICAT which supports JPDA and its new functionality.

BRIEF DESCRIPTION OF THE DRAWINGS

The following detailed description when taken in conjunction with the figures presented herein provide a complete disclosure of the invention.

SUMMARY OF THE INVENTION

A method and system are disclosed which provide improved source-level debugging capabilities of an object-oriented application propam which may include linked native language dynamic load libraries. The improved debugger is compatible with the Java Platform Debugger Architecture ("JPDA"), and provides new capabilities such as patching of Java variables and reading and writing strings from and to the application under test and being mu by a local or remote Java Virtual Machine.

DETAILED DESCRIPTION OF THE INVENTION

The designers of JPDA intended that most debugger developers, e.g. those developers who design debug tools, to use JDI. According to the preferred embodiment of the present invention, JDI is adopted as the interface for the improved ICAT probe. By modifying the currently-available ICAT to use JPDA, users of the new ICAT have access to the new features immediately and in future ICAT releases. For clarity and distinction, the existing debugger tool will be referred to as "ICAT", and the present invention will be referred to as "ICAT2".

According to the preferred embodiment, the existing ICAT probe design as disclosed in U.S. Pat. No. 5,901,315, to Edwards, et al., is used as a starting point, with modifications as disclosed herein in order to migrate the existing ICAT to support JPDA. An advantage to this approach included using existing ICAT capability for instantiating multiple debuggers on multiple platforms. However, it is possible to realize the net design disclosed herein in conjunction with the design disclosed in the Edwards patent as an entirely new program or tool.

Method names and interfaces used herein are consistent with Sun Microsystems' JPDA API version 1.0, which is well known in the art and for which documentation is freely available. Sun Microsystems provides a foil reference set for JPDA from their web site or for purchase in print form. Specifically, the "Java Platform Debugger Architecture Javat™ Virtual Machine Debug Interface Reference" is hereby incorporated by reference to this disclosure.

Figure 15:
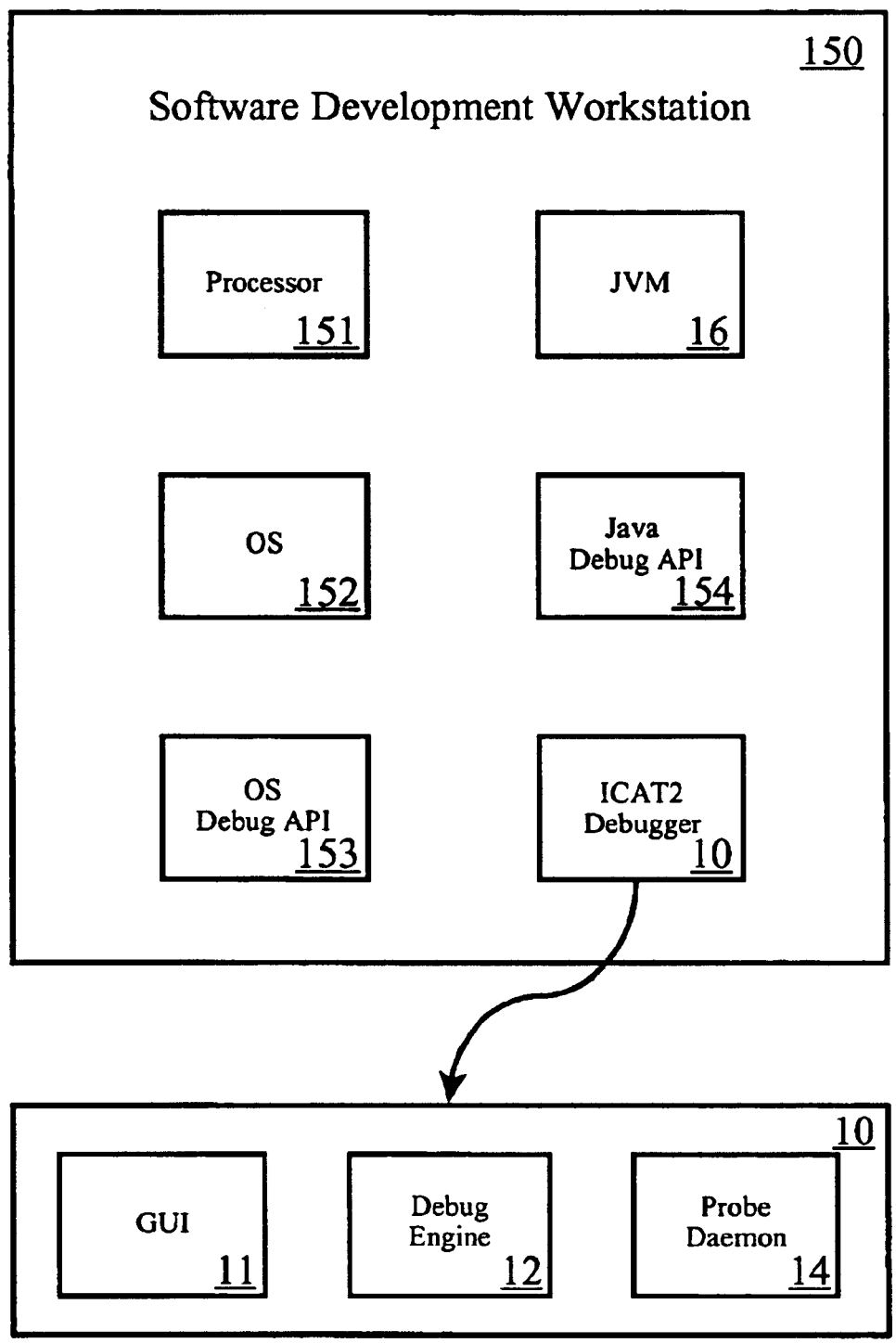
FIG. 15 is a block diagram of a representative computer in which the present invention is implemented in whole or in part, including the main components of the debugger of the present invention.

As will be described in more detail below, one or more of the processes that comprise the "debugger" of the present invention may be carried out on a computer, or on one or more computers connected via a computer network. Referring to FIG. 15, a computer for use in realizing the present invention is shown. The software development workstation computer 150 has a processor 151, an operating system 152, an operating system debug application programming interface ("API") (153) and a Java virtual machine (JVM) interpreter (16). The JVM has an associated Java debug API (154) to enable an application program designer to debug Java code.

Thus, for example, the computer (150) used in the present invention is any personal computer or workstation platform, such as an Intel[™]-, PowerPC[™]- or RISC[™]-based computer, and that includes an operating system such as IBM[™] OS/2[™], Microsoft Windows[™] '95/98/2000/NT, UNIX, or IBM AIX[™]. Such a representative computer runs an Intel Pentium[™] processor, OS/2 Warp Version 3 operating system, the DosDebug system API and JVM Version 1.3 or greater.

Also shown in FIG. 15 is a high-level block diagram of the main components of the debugger of the present invention, described in more detail in the following paragraphs.

ICAT2 on a Single System

Figure 1:
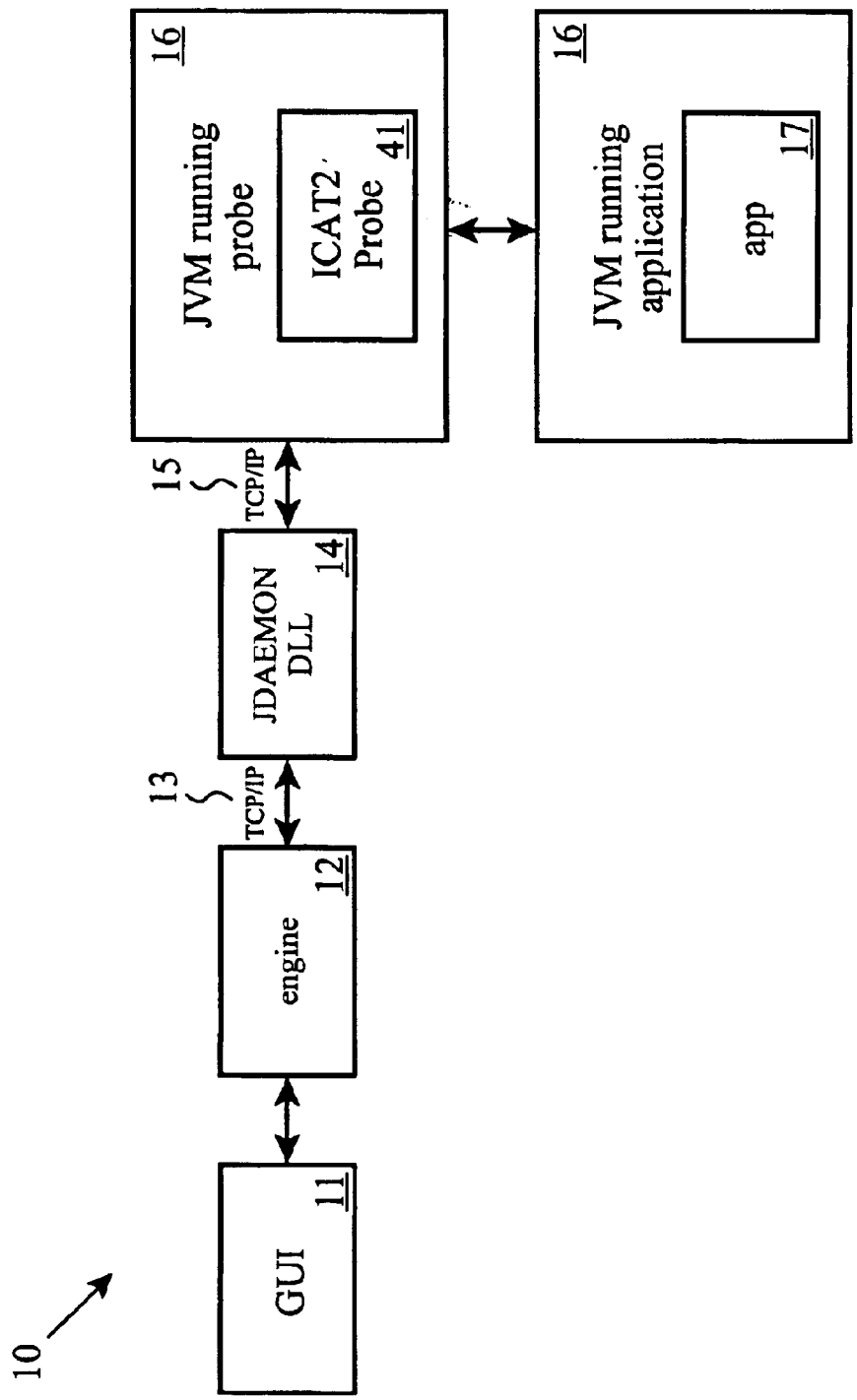
FIG. 1 shows the arrangement of the components of the debugger system within a single computer system.

FIG. 1 discloses the relationship (10) of the various components of ICAT2 when it is used to debug an application with the debugger running in the same computer platform as the application. A users graphical user interface (11) is provided to allow the user to view status, data, and to input commands to load processes, set breakpoints, etc. An engine (12) is used to communicated to a daemon DLL (14), preferably by a well-known protocol such as TCP/IP messages (13). The daemon DLL (14) in turn communicates to the Java Virtual Machine (16) which is running the ICAT2 probe (41). Again, communications to the JVM (16) is preferably TCP/IP messages (15). Finally, the ICAT2 probe (41) communicates to a separate instantiation of the JVM (16) running the target application (17).

Figure 2:
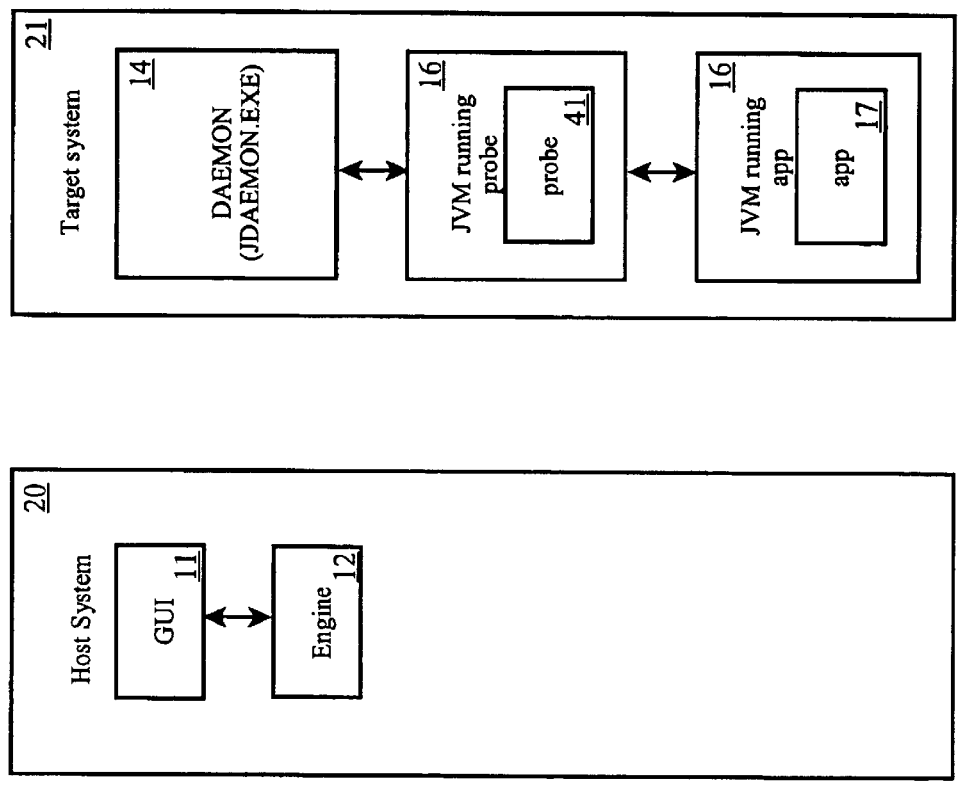
FIG. 2 illustrates the arrangement of the components of the debugger system when debugging is performed from a host system while executing the target application on a remote target system.

In this example, both the target application (17) and the ICAT2 debugger (10) are running on the same computer platform, so the communications between the various components of the system are usually internal to the computer itself Running ICAT2 on Two Systems Turning to FIG. 2, the ICAT2 user interface is run on a local computer, or "host system", (20), while the target application (17) is run by the JVM (16) on a remote "target system" (21). This is a common arrangement found during Java software development, where a number of potential target systems may be available over a computer network for a designer to use for debugging an application. The user then establishes communications with the target system using the user's own workstation as a host system. The choice of TCP/IP for communications within the single-system arrangement lends itself to dividing the components of the system between a host system (20) and a target system (21). In this case, the TCP/IP communications (13) between the engine (12) running on the host system (20) to the daemon (14) running on the target system (21) is carried preferably over a computer network such as a Local Area Network ("LAN") or even the Internet.

Connecting to the JVM

Figure 3:
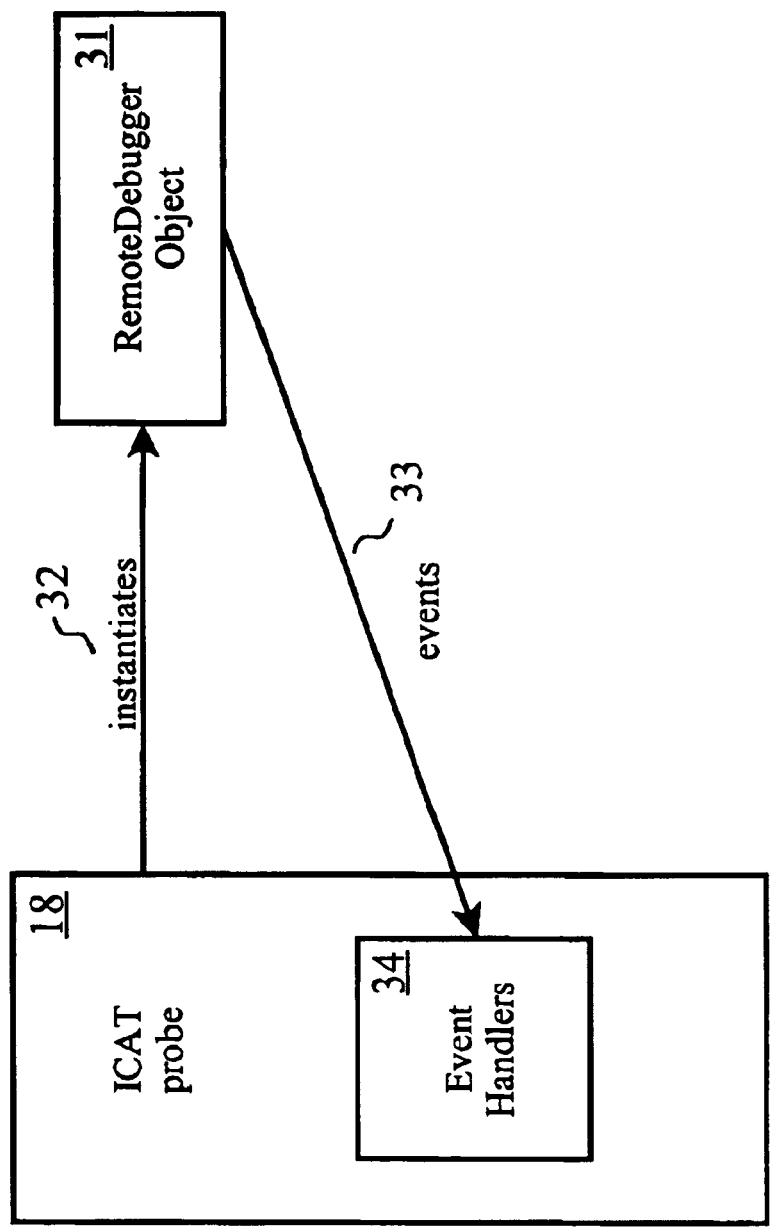
FIG. 3 shows the process of launching an application using the sun.tools.debug API.

First, the ICAT2 probe must establish a connection to the JVM. With the sun.tools.debug API, this was a relatively straightforward process, as shown in FIG. 3. A Remote Debugger ("RD") object (31) was instantiated (32) by the probe (18). The parameters to the RD constructor included the name of the application to be debugged (and any parameters to be passed to the application) and a pointer to the probe, which told RD that the probe would provide the required event handlers (breakpointEvent, exceptionEvent, etc.) (34).

Figure 4:
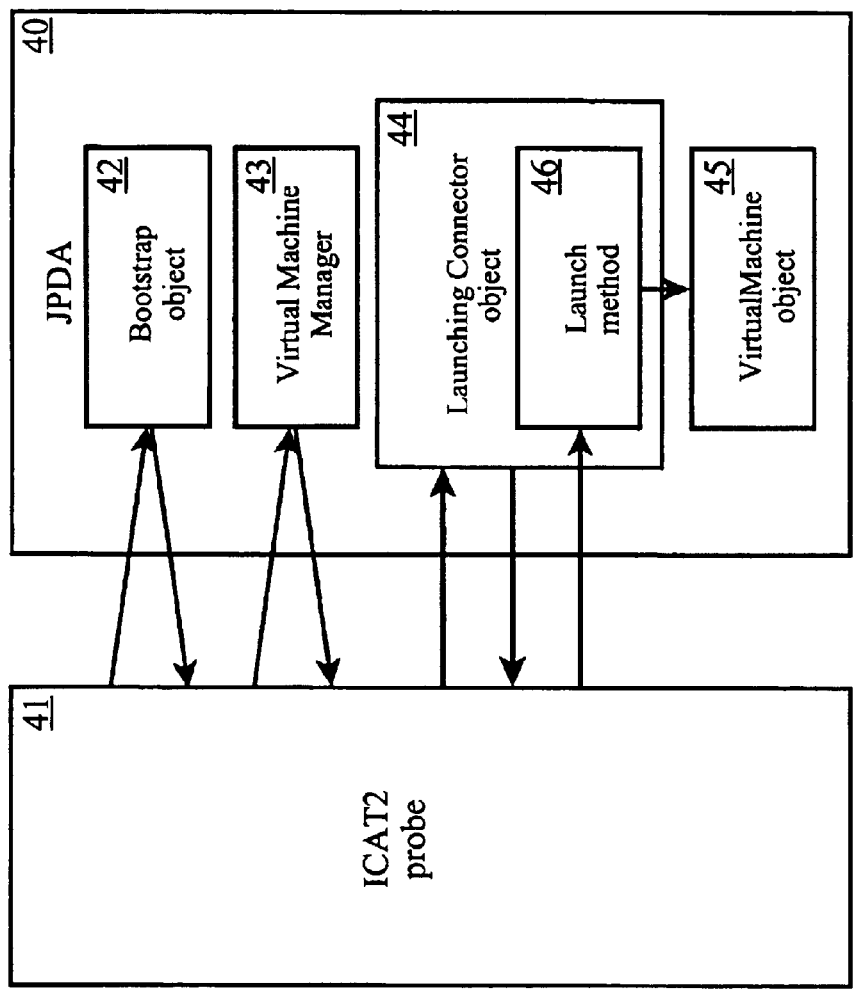
FIG. 4 depicts the process of launching an application by the present invention using JPDA.

Turning to FIG. 4, the process of connecting to the JVM is a bit more complicated with JPDA, but JPDA supports multiple types of connectors, which facilitate attaching and listening, in addition to launching. ICAT2 supports launching applications through JPDA's LaunchingConnector (LC) (44), as shown in FIG. 4.

JPDA provides a Bootstrap object (42) that allows access to the JDI interfaces. The Bootstrap object (42) is used to obtain the VirtualMachineManager (43). The VirtualMachineManager (43) provides a list of connectors of various types. The present invention, ICAT2, iterates through the list of connectors, and searches for "com.sunjdi.CommandLineLaunch", which is stored away as a Connector object.

Launching the Application

In the older ICAT with the sun.tools.debug API, the launching process was accomplished when RD was instantiated. However, according to the present invention ICAT2 with JPDA (40), the application is launched when the probe function "launch_then_attach" (46) is called. There is a set of arguments associated with each connector. The "main" argument is set to the name of the application, and the "suspend" argument is set to true. Then, ICAT2 invokes the launch method on the "LC" object. The parameters given to the method are connector arguments. The launch method returns a VirtualMachine (VM) object (45) to the probe (41).

The VM object (45) is similar to the RD object in the sun.tools.debug API. The VM object (45) mirrors the state of the JVM and provides the objects and methods needed for controlling the application under debug, as did the previous RD object.

Figure 14:
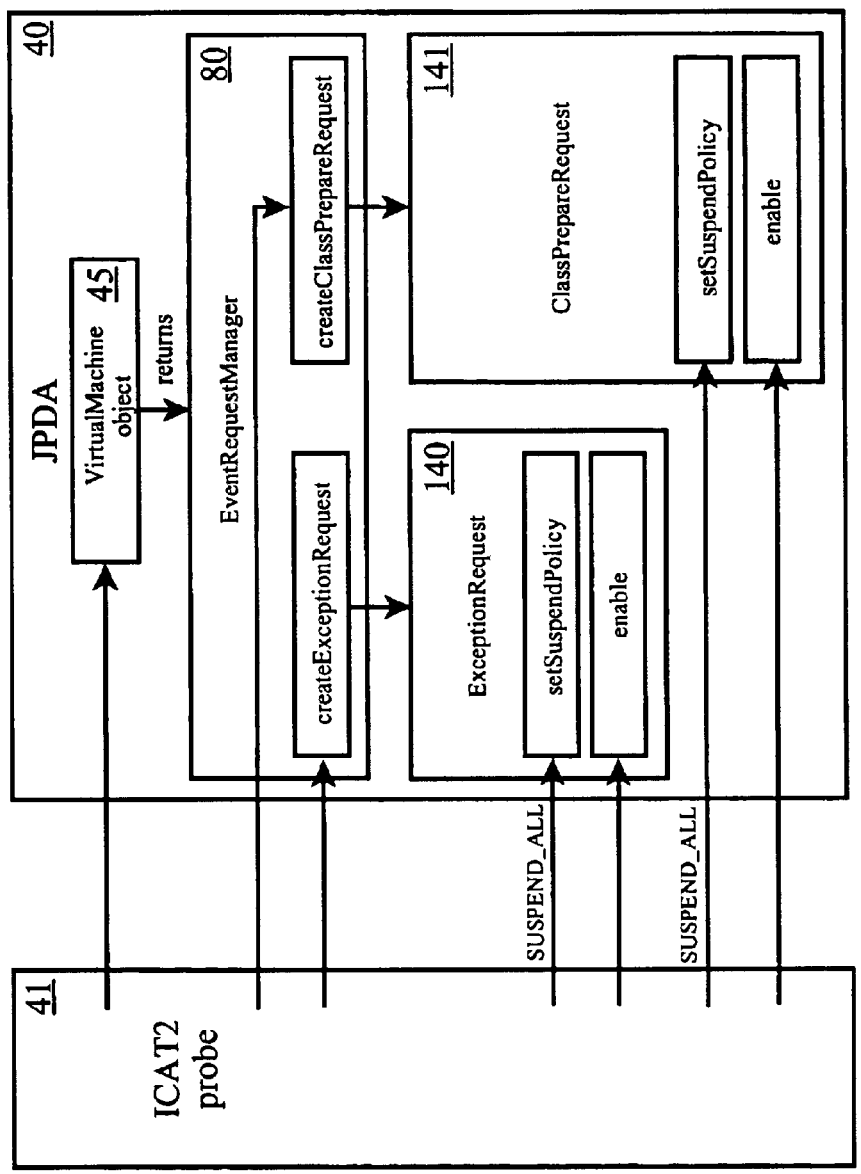
FIG. 14 shows the use of the Event Request Manager as employed by the present invention.

Next, the probe obtains the EventRequestManager ("ERM") from the VM object (45), as shown in FIG. 14. The event handling code in the ICAT2 probe (41) makes extensive use of the ERM (80). First, an exception request (140) is created to tell the JVM to suspend the application in response to any exception that occurs. This is the default. In ICAT2, the user can later select whether to catch or ignore specific exceptions that occur within "try" blocks. Next, the modified ICAT2 creates a request (141) to be notified each time a class is loaded. In JPDA, notifications of class loads are called ClassPrepareEvents. ICAT2 also request to be informed of thread death events.

For each of the request objects created above, ICAT2 must indicate that it requires the JVM to suspend the application at the time an event occurs. This is done by calling the setSuspendPolicy method on each object and passing the parameter SUSPEND_ALL. This indicates that all JVM threads are to be suspended when an event occurs. Finally, the request objects are enabled by invoking the "enable" method.

The ICAT2 probe then enters a loop in which events are received, shown in FIG. 6 and described in more detail later. These events are processed until the class prepare event is received for the application that was launched. At this point, the ICAT2 probe (41) reads in a list of the currently loaded classes (also called "modules"). Then, a thread is spawned which enters an event retrieval loop that runs continuously as long as the probe is active. This completes the processing for the launch_then_attach function.

Obtaining Stack Information

The ICAT2 probe relies heavily on the facilities for obtaining information about the "call stack". This is handled by the ICAT2 probe similarly to the ICAT probe process. With each API, the thread object is used to obtain the data. In the sun.tools.debug API this object is the RemoteThread (RT), in JPDA it is ThreadReference (TR).

Handling Events

The JVM notifies the debugger of asynchronous occurrences by using events. The probe MUST provide event handlers for certain events, even if it chooses not to take any action. This is true for both the sun.tools.debug API and JPDA.

Figure 5:
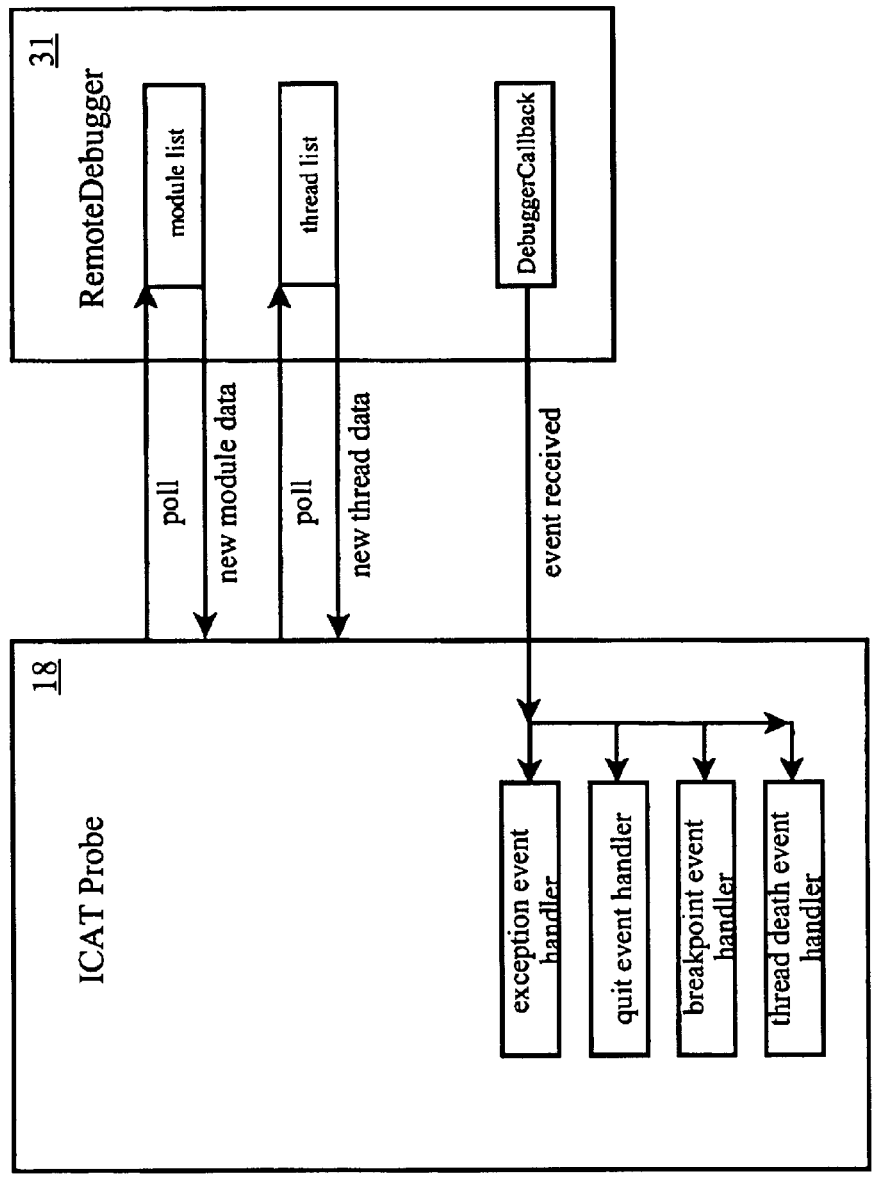
FIG. 5 sets forth the process of handling events using the sun.tools.debug API.

As shown in FIG. 5 with the sun.tools.debug API, in ICAT the only events reported were the ones for which event handlers were provided. To generate other events, the probe had to provide code to check constantly, or "poll", for new modules and threads. The ICAT probe then sent, for example, a "module loaded" event to ICAT.

Figure 6:
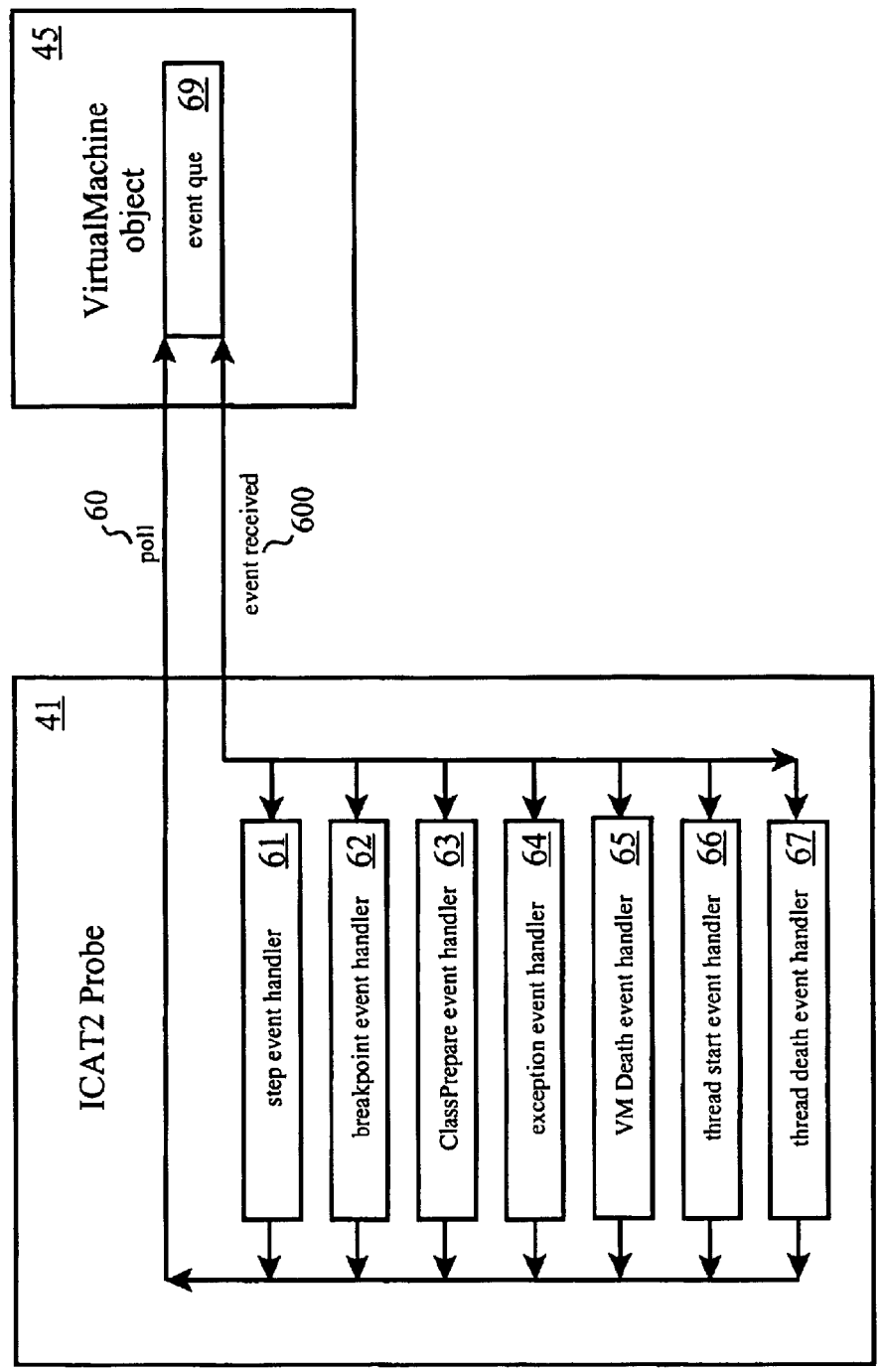
FIG. 6 depicts the process of handling events by the present invention using JPDA.

With JPDA, there are more event handlers that must be provided by the ICAT2 probe, as disclosed in FIG. 6. Also, a debugger designer can optionally request to be notified of a number of additional events (for example, see "Launching the Application" above). The VM object (45) has an EventQueue (46) which must be polled (60) to see these requested events, which are objects themselves. In the ICAT2 probe (41), events (600) are taken off the event queue (69) and checked to determine the event type. A call is then made to the proper event handler (61 through 67) for each event.

The processing for an event is notably different between the two APIs, sun.tools.debug and JPDA. With the sun.tools-.debug API, the exception handlers were called with an RT object provided. The information about the event was obtained from the RT. However, with JPDA, the information is obtained from the event object.

Further, JPDA adds several new event handlers. The ICAT2 probe provides a function for each of these, although many of these functions may be empty.

The stepEvent is new with JPDA. With the sun.tools.debug API, the completion of a step or a breakpoint hit was considered a "breakpointEvent". The probe code had to sort out the situation and determine what had happened. However with JPDA, there are separate handlers for stepEvent and breakpointEvent, and therefore separate event handlers (61 and 62) are provided by the ICAT2 probe (41).

With JPDA, the JVM generates an event whenever a class is loaded. This is called a ClassPrepareEvent. This new JPDA capability is a major improvement over the sun.tools-.debug API, through which it was necessary to poll the JVM periodically for a list of loaded classes to determine if any new classes had been loaded. Thus, a ClassPrepare event handler (63) is provided in the ICAT2 probe (41).

JPDA provides other new events that are not used in the preferred embodiment, including: VM start event, field watch event, VM interrupted event, method entry event and method exit event. The ICAT2 probe (41), however, provides a handler for each of these events, though the handler doesn't necessarily act on the events.

Exception event handling is similar between JPDA and the sun.tools.debug API. As mentioned before, the information about the exception comes to the probe in an ExceptionEvent object using JPDA, rather than from the RT object in under the sun.tools.debug API. An exception event handler (64) is provided in the ICAT2 probe (41) to handle receipt of an ExceptionEvent.

Thread death events must be handled with the sun.tools-.debug API but are optional with JPDA. The sun.tools.debug API has a quit event which is analogous to the VM death event with JPDA. The architecture of ICAT2 requires notification of thread death events, so the ICAT2 probe (41) requests these events from the VM object (45). A VM death event handler (65) is provided in the ICAT2 probe (41) to handle receipt of an VMDeathEvent.

Further, thread start event and thread death event handlers (66 and 67) are provided in the ICAT2 probe (41).

Stepping

Figure 7:
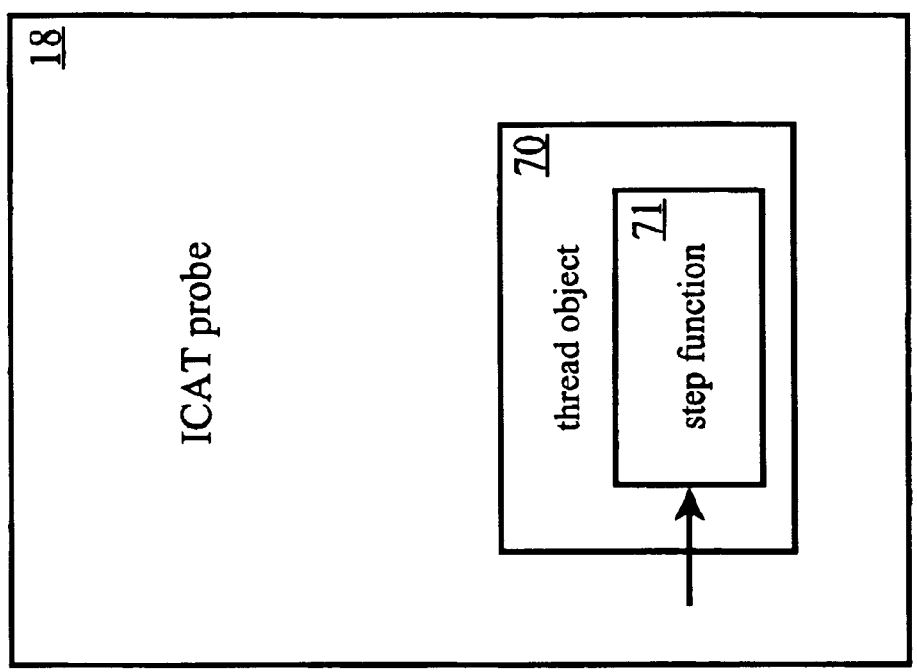
FIG. 7 illustrates the process of stepping through an application using the sun.tools.debug API.

Issuing a step in the sun.tools.debug API was fairly straightforward, as shown in FIG. 7. The thread object (70) had a "step" member function (71). The parameter to this function was a Boolean which indicated whether the step was to be a line step or an instruction step.

Figure 8:
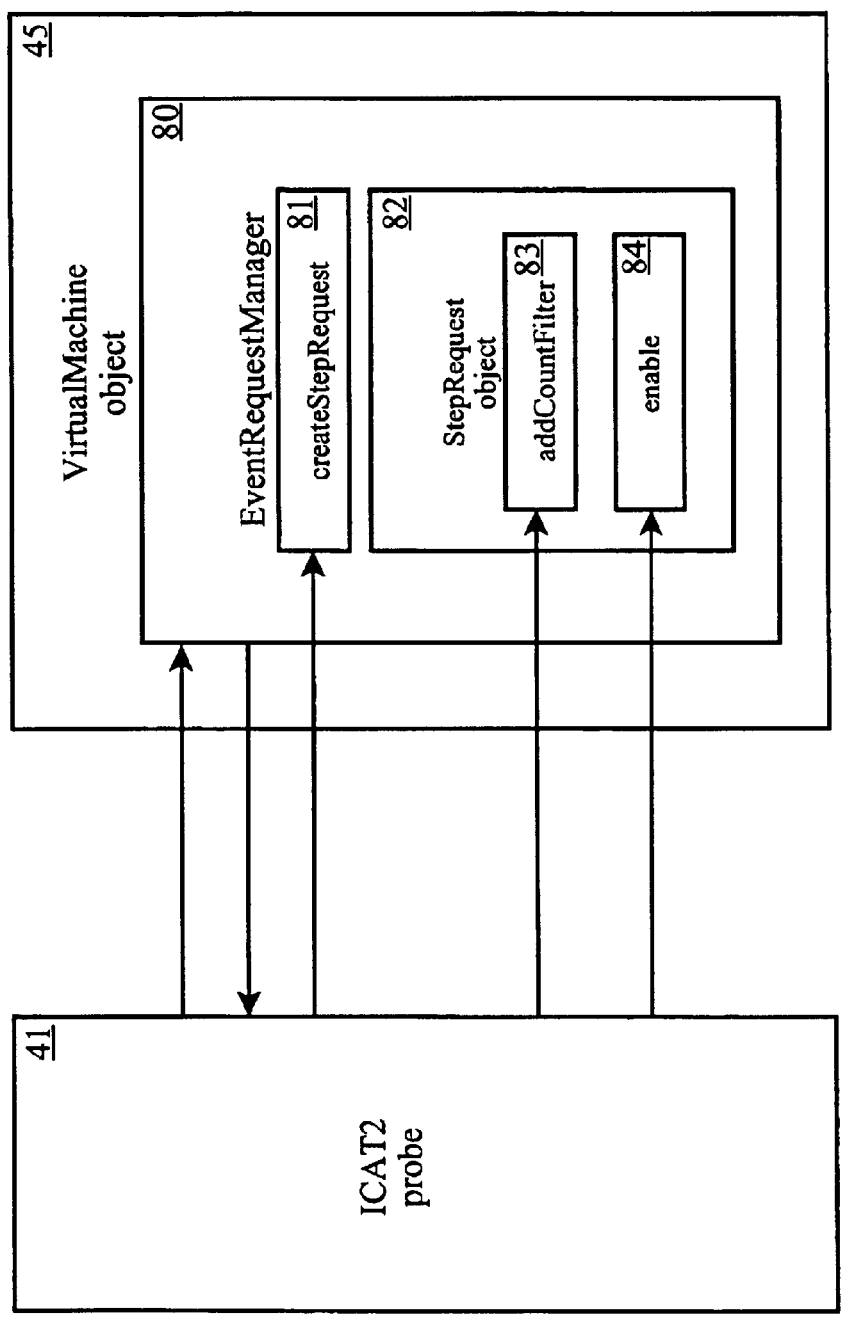
FIG. 8 depicts the process of stepping through an application by the present invention using JPDA.

With JPDA, the ICAT2 probe (41) first obtains the ERM (80) from the VM object (45), as shown in FIG. 8. From the ERM (80) a list of any outstanding step requests is obtained for the thread of interest. ICAT2 may delete any outstanding requests found. The ERM (80) has a method called "createStepRequest" (81). The parameters to this method indicate the type of step desired. The first parameter is the TR of the thread to be stepped, and the second is the size of the step. There are two sizes, "min" (minimum—which is generally an instruction step), and "line". The third parameter is depth, which may have the values "into", "over" and "out".

A count filter is added (83) to the request (82) next. The count filter is preferably set to 1, which gives the ICAT2 probe (41) a single notification when the step is completed. Finally, the request is enabled (84) and the JVM is resumed.

Obtaining Memory Usage Information

For ICAT2's memory usage window, few changes from ICAT were required. The information about free memory and total memory was available to ICAT from the RD with the sun.tools.debug API, which is now available to ICAT2 from an object called "Runtime" with JPDA. As such, ICAT2 obtains memory usage information from the JPDA Runtime object.

Obtaining Thread Names

JPDA allows ICAT2 to obtain the name of any thread, whereas the sun.tools.debug API RD did not support this. The TR object has a method that returns the name, which is employed by ICAT2 to obtain the name of any thread.

Filtering Exceptions

ICAT2 allows the user to choose whether or not to have the debugger report exceptions that occur within "try" blocks. When an exception occurs outside a "try" block, execution always stops and the exception is reported to the user.

With the sun.tools.debug API, catching or ignoring exceptions in ICAT was a relatively simple process. The RemoteClass (RC) object had both an "ignoreExceptions" and a "catchExceptions" method. In order to obtain an exception object, the "findClass" method on RD was called. This loaded the class if it is not already loaded.

The exception filtering process for ICAT2 with JPDA is more complicated than with sun.tools.debug. If the exception class of interest is not loaded, it must be loaded according to a process described below. If a request object for the exception already exists, ICAT2 disables and deletes it so that a new one can be created. When ICAT2 calls "createExceptionRequest", one of the parameters to the method is a Boolean which indicates whether caught exceptions (exceptions within a "try" block) are to be reported or ignored. The newly created "ExceptionRequest" object is enabled after setting the suspend policy.

Loading Classes

Figure 11:
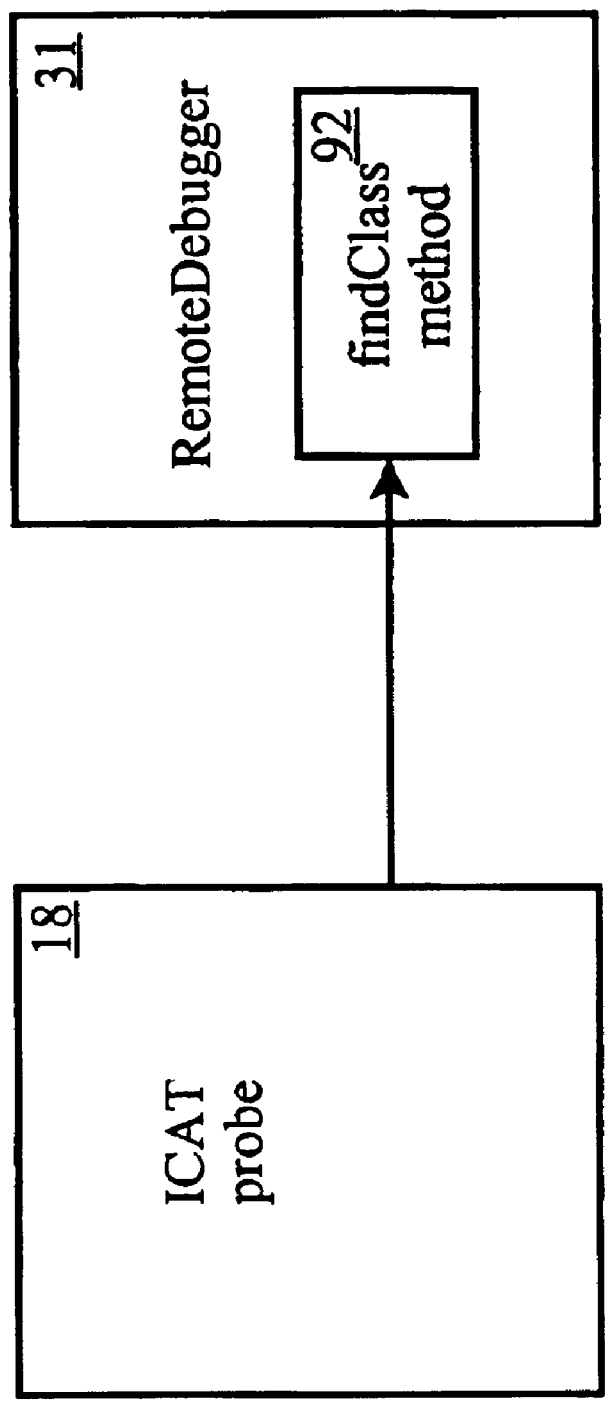
FIG. 11 sets forth the process of loading classes using the sun.tools.debug API.

There are several circumstances in which a debugger such as ICAT or ICAT2 must force the loading of a class. ICAT provided a function with which the user could request the forced loading of a class. As shown in FIG. 11, this was relatively uncomplicated with the sun.tools.debug API since the "findClass" method (92) automatically loads a class if it is not already loaded.

Figure 12:
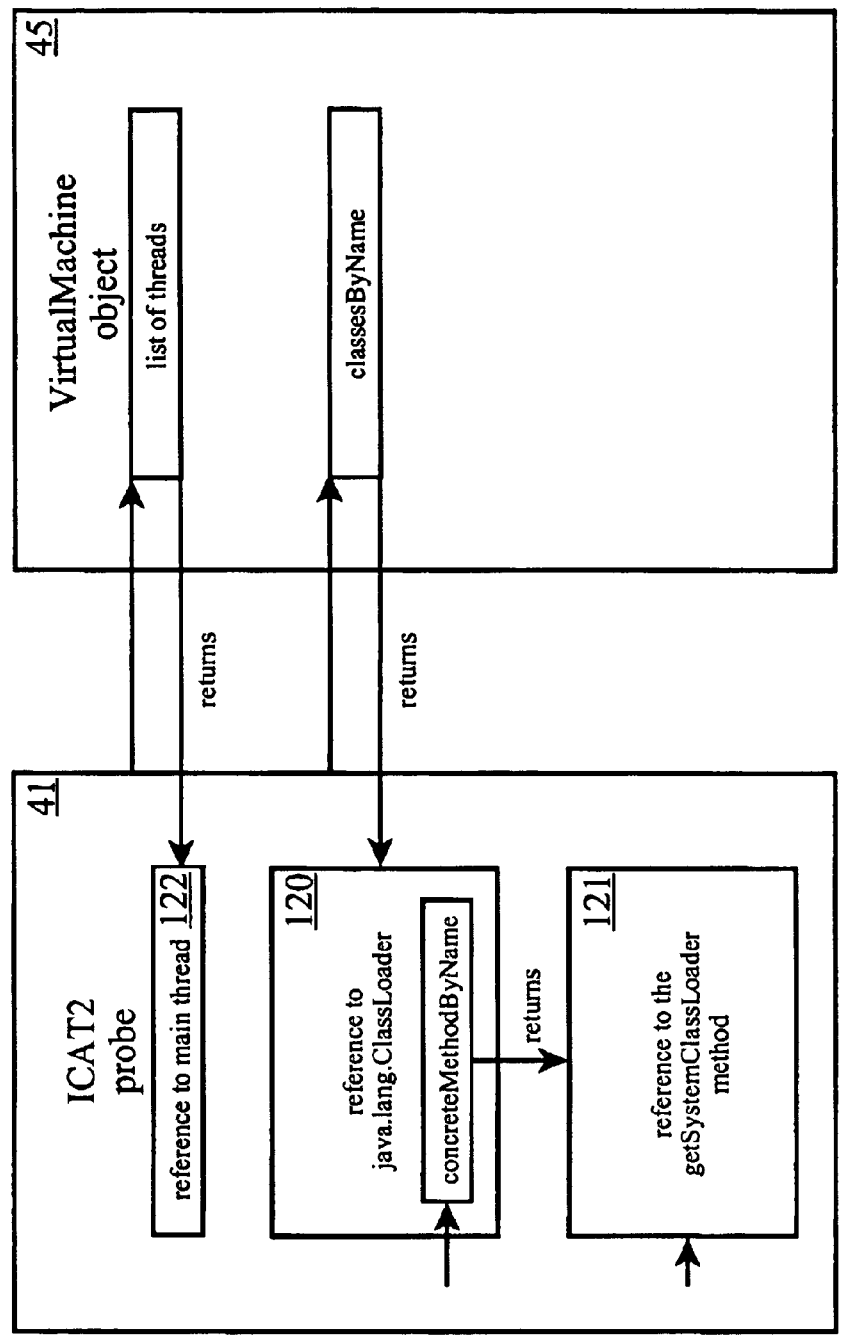
FIG. 12 depicts the process of loading classes by the present invention using JPDA.

However, class loading is a multi-step process with JPDA, as shown in FIG. 12. ICAT2 first must obtain a reference to java.lang.ClassLoader (120). ICAT2 then has to obtain a reference to the method "getSystemClassLoader" (121), which is then invoked. In order to do so, ICAT2 must have a reference to an application thread. Unfortunately, this does not work for any thread other than the main thread, so a reference to the main thread (122) is obtained by the ICAT2 probe. Since the main application thread can terminate before the application terminates, it is possible that the user will see a situation in which it is impossible to force the loading of a class.

Obtaining Thread Status

JPDA has the ability to obtain the status of any application thread, such as "running", "sleeping", "waiting", "not started", etc. The TR object has a member function called "status" which returns this information when invoked by the ICAT2 probe.

Providing and Displaying a Console Message Window

Figure 13:
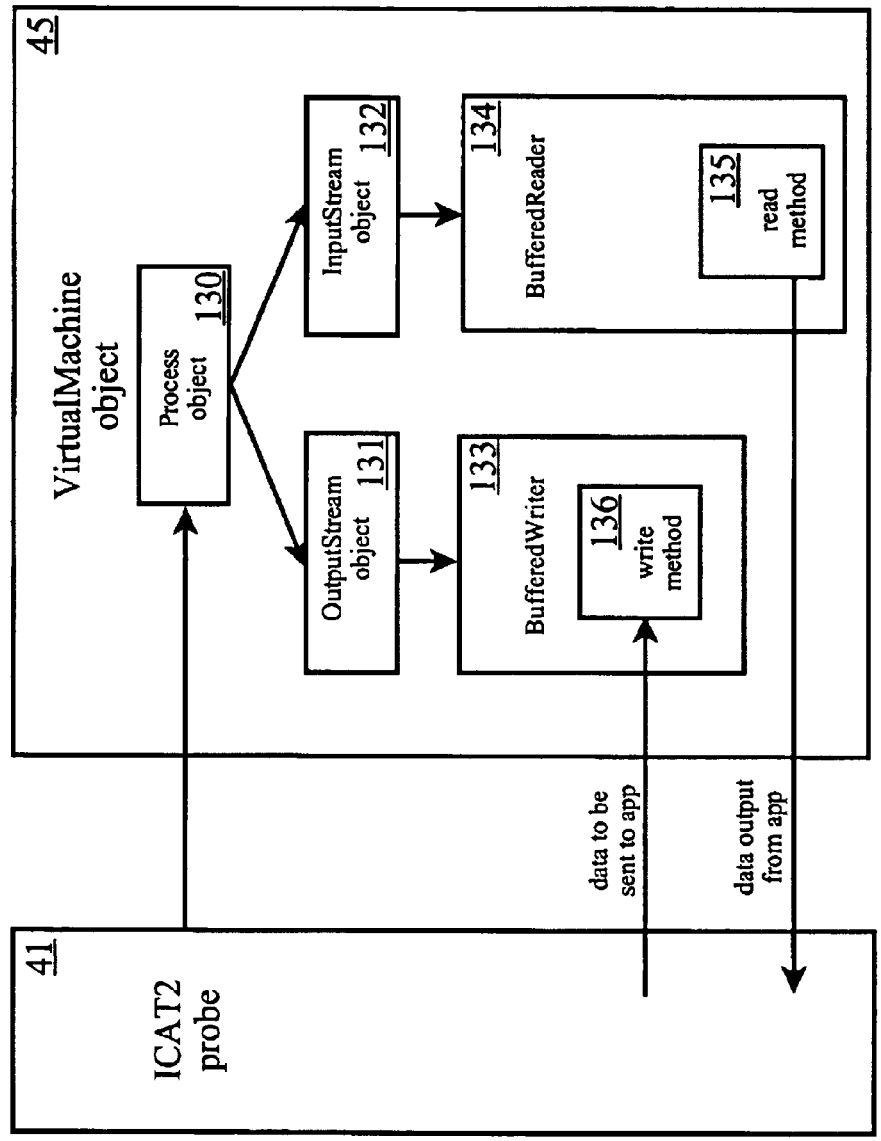
FIG. 13 illustrates the process of providing a console message window for the present invention.

The move to JPDA allows ICAT2 to provide a console window, as shown in FIG. 13. This permits users to see output printed by the application, and to send data to the application. In order to allow writing data to the application, the ICAT2 probe (41) first obtains the "Process" object (130) from the VM object (45). The "OutputStream" (131) is obtained from the "Process" object (130). The OutputStream is used to instantiate a "BufferedWriter" (133). The "write" method (136) on the "BufferedWriter" object (133) is called in order to write data to the application from the console message window.

For obtaining data that is printed by the application and presenting it on the console message window, a "BufferedReader" object (134) is created in a manner similar to that used to create a BufferedWriter, including obtaining the Process object (130) from the VM object (45), obtaining the InputStream object (132) from the Process object (130), instantiating a BufferedReader object (134), and using the "read" method (135) to retrieve data from the application.

Setting Breakpoints

Figure 9:
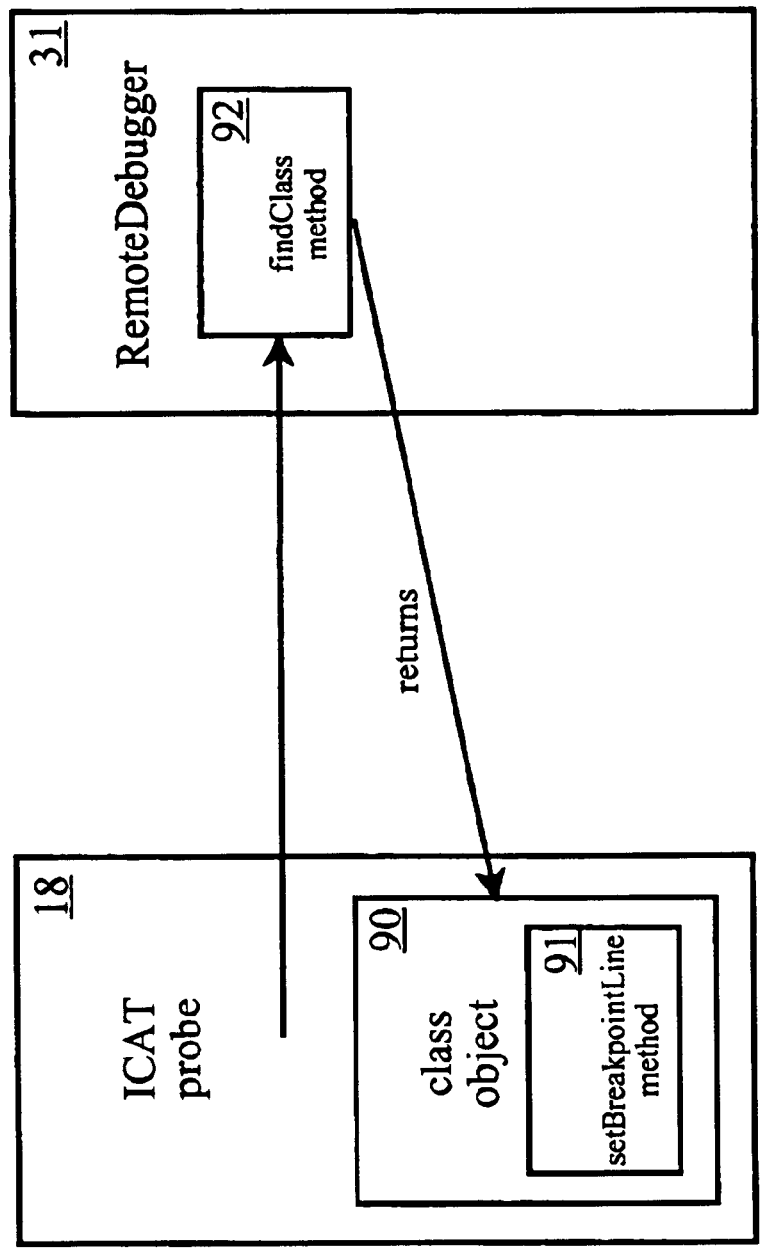
FIG. 9 sets forth the process of setting breakpoints in an application using the sun.tools.debug API.

Turning to FIG. 9, the process employed by the ICAT probe (18) with the sun.tools.debug API to set a breakpoint is fairly simple, which involved calling the findClassmethod (92) of the RD (31) and the "setBreakpointLine" method (91) on the class where the breakpoint was to be placed. The line number provided was the source line. There was no provision for setting breakpoints at an arbitrary bytecode address.

Figure 10:
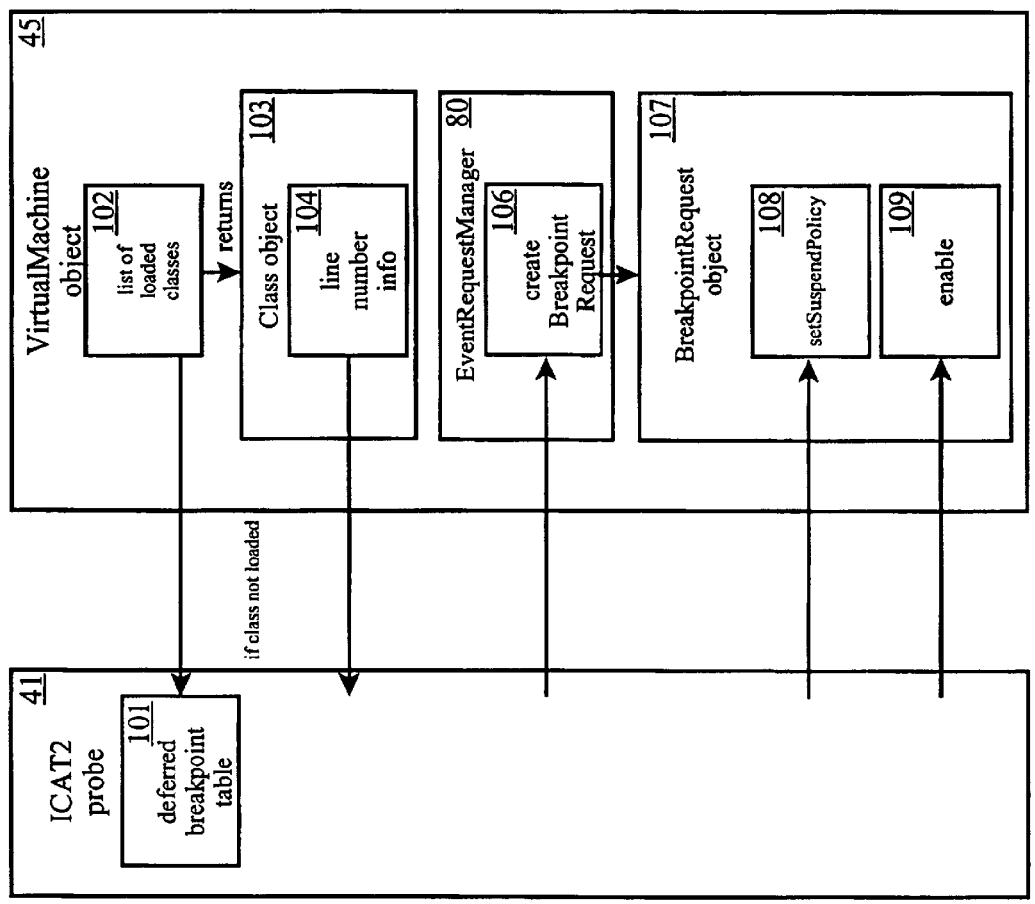
FIG. 10 shows the process of setting breakpoints in an application by the present invention using JPDA.

The ICAT2 probe (41) with JPDA first obtains a list of the loaded classes (102), as shown in FIG. 10. If the class where the breakpoint is to be placed is not loaded, the setting of the breakpoint is deferred by adding it to deferred breakpoint table (101) to be installed later. If the class is loaded, the line number information is obtained from the class object (103). Then the breakpoint request (106) is instantiated (107) by the ERM (80), its suspend policy is set (108), and the request is enabled (109).

Clearing Breakpoints

Clearing a breakpoint was similarly straight forward with the sun.tools.debug API for ICAT. The method that was used was "clearBreakpointLine".

For ICAT2 with JPDA, a list of the active BreakpointRequests must first be obtained. If ICAT2 finds one that matches the user's requested breakpoint deletion, that BreakpointRequest object is deleted using a JPDA API command.

Halting an Application

In order to halt the application, ICAT2 obtains a list of the current application threads by calling the VM's "allThreads" method. ICAT2 then iterates through this list and invokes the JPDA API "suspend" method on each thread that is not already suspended.

Requesting Thread Information

When ICAT2 obtains the list of threads from the VM object (45), it checks to make sure that the thread group is the main group, which is the group of application threads. Any threads that are in the main group are added to the list that is returned.

Resuming Execution

The "resume" command to the probe is a request to restart execution of the application. Resuming is one area that may be simpler with JPDA than with the sun.tools.debug API.

ICAT invoked one of three methods through the sun.tools.debug API: the "run" or "cont" method on the RD object, or the "resume" method on any particular RemoteThread object.

ICAT2 using the JPDA API reviews the current list of step requests and deletes any that are currently active. Then, ICAT2 invokes the "resume" method on the JVM object.

Excluding Classes

During migration from ICAT with sun.tools.debug to ICAT2 with JPDA, a new feature was brought to ICAT2: the ability to exclude classes when stepping. This allows users to prevent ICAT2 from stopping in certain classes when stepping. It is possible to exclude entire sets of classes by use of an asterisk. For example, to exclude all classes beginning with "abc.def", the user sets the environment variable CAT_CLASS_EXCLUDE=abc.def.*. This would exclude abc.def ghi, abc.def.jkl, etc. The ICAT2 probe excludes classes by invoking the "addClassExclusionFilter" method on the step request object.

Evaluating Expressions

For expression evaluation, no major changes were needed to the probe to migrate from the sun.tools.debug API to JPDA. A line-by-line replacement of RD objects and methods with VM objects and methods is sufficient. However, the ICAT2 user is now able to modify Java variables.

Initializing Objects

The "ExpressionEvaluator" and "ExpressionServices" constructors are initialized with a VM object in place of an RD object.

Accessing and Querying of Debuggee Classes

The VM contains methods (classesByName and allClasses) for returning ReferenceType objects in the debuggee. The ReferenceType object contains the necessary methods for accessing information about the class under test such as class methods, fields, types, values, static, final, etc.

Adding New Function

Modifying Symbols.

JPDA provides "setValue" and "mirrorOf" utilities. SetValue performs modification of static and instance fields, strings, array elements, and Booleans. MirrorOf returns an access reference to the type being modified. A new method, update_value, was added to the probe which utilizes both of these utilities to change dynamically and return new field values to the user during a debug session.

Evaluating Strings.

Although ICAT provided string evaluation, ICAT2 with JPDA includes a StringReference interface, which extends ObjectReference. This means that ICAT2 can treat the string as a class, and therefore provide the user with much more information pertaining to the string. The RmtStringValue class was subsequently eliminated, with the new string evaluation code included in RmtObjectValue class.

What is claimed is:

1. A method of debugging an application comprising Java code and native method dynamic load libraries, the method operating in a computer having an operating system, a system debug application programming interface (API), and a Java Virtual Machine having a Java Platform Debugger Architecture (JPDA) Virtual Machine Debug Interface API, said method comprising the steps of:

launching a Java virtual machine (JVM) under the system debug API;

using a JPDA bootstrap object to obtain a JPDA Virtual Machine Manager;

accessing a list of connectors from said Virtual Machine Manager;

connecting a probe program to said JVM by iterating through said list of connectors and storing a command line launch object as a connector object;

executing an application program for debug and test under the JVM by setting a main argument for the connector object to the name of said application program, setting a suspend argument for the connector object to true, invoking a launch method, which returns a Virtual Machine (VM) object to the probe program, creating one or more exception requests for suspending the application program when an exception event occurs, creating a notification request for loading of classes and thread deaths, reading a list of loaded classes, and spawning a thread which enters an event retrieval loop; and simultaneously debugging Java code of said application program and one or more native method dynamic load libraries as the application is executing under the Java virtual machine, wherein the Java code is debugged using the Java Platform Debugger Architecture Virtual Machine Debug Interface API and wherein the native method dynamic load libraries are debugged using the system debug API.

2. The method as described in claim 1 wherein the step of simultaneously debugging the Java code and the native method dynamic load libraries includes providing and displaying a console message window which permits a user to view output printed by the application.

3. The method as described in claim 2 wherein said step of providing and displaying a console message window includes the steps of:

obtaining a Process object from the virtual machine;
obtaining an InputStream object from the Process object,
creating a "BufferedReader" object; and
using a read method to retrieve data from the application.

4. The method as described in claim 1 wherein the step of simultaneously debugging the Java code and the native method dynamic load libraries includes providing and displaying a console message window which permits a user to write data to the application.

5. The method as described in claim 4 wherein said step of providing and displaying a console message window includes the steps of:

obtaining a Process object from the virtual machine;
obtaining an OutputStream object from the Process object,
creating a "BufferedWriter" object; and
using a write method to write data to the application.

6. The method as described in claim 1 wherein the step of simultaneously debugging the Java code and the native method dynamic load libraries includes providing the ability to exclude classes when stepping execution by use of an asterisk when invoking an "addClassExclusionFilter" method on a step request object.

7. The method as described in claim 1 wherein the step of simultaneously debugging the Java code and the native method dynamic load libraries includes providing string evaluation with a StringReference interface which extends an ObjectReference such that a string is treated as a class.

8. The method as described in claim 1 wherein the step of simultaneously debugging the Java code and the native method dynamic load libraries includes modifying symbols such as static and instance fields, strings, array elements, and Booleans, by:

invoking a mirrorOf utility to obtain an access reference to a type of symbol to be modified; and
invoking a setValue utility to modify the value of the symbol.

9. The method as described in claim 1 wherein the step of simultaneously debugging the Java code and the native method dynamic load libraries includes setting a breakpoint by:

obtaining a list of the loaded classes;
obtaining line number information from a class object;
instantiating a breakpoint request;
setting the breakpoint request suspend policy; and
enabling the breakpoint request.

10. The method as described in claim 9 wherein the step of setting a breakpoint further comprises adding the breakpoint to a deferred breakpoint table if the class where the breakpoint is to be located is not already loaded.

11. The method as described in claim 1 wherein the step of simultaneously debugging the Java code and the native method dynamic load libraries includes loading classes by:

obtaining a reference to a method "getSystemClassLoader"; and
invoking said method to load a class.

12. The method as described in claim 1 wherein the step of simultaneously debugging the Java code and the native method dynamic load libraries includes stepping through execution of the application by:

obtaining an event request manager from the virtual machine;
invoking a method of the event request manager to create a new step request including a step size parameter;
enabling the new step request; and
resuming the virtual machine.

13. The method as described in claim 1 wherein the step of simultaneously debugging the Java code and the native method dynamic load libraries includes handling events from the virtual machine by:

providing a plurality of event handlers, one event handler for each requested event object to be processed;
polling a virtual machine event queue to determine if any requested event objects are queued;
removing requested event objects from the event queue;
determining the event object type; and
calling an event handler according to the determined event object type.

14. A computer-readable medium containing program code for a software development workstation for debugging an application comprising Java code and native method dynamic load libraries, the software development workstation comprising a computer with an operating system, a system debug application programming interface (API), and a Java Virtual Machine having a Java Platform Debugger Architecture Virtual Machine Debug Interface API (JPDA), said program code when executed by said computer causing said computer to perform the steps of:

launching a Java virtual machine (JVM) under the system debug API;
using a JPDA bootstrap object to obtain a JPDA Virtual Machine Manager;
accessing a list of connector from said Virtual Machine Manger;
connecting a probe program to said JVM by iterating through said list of connectors and storing a command line launch object as a connector object;
executing an application program for debug and test under the JVM by setting a main argument for the connector object to the name of said application program, setting a suspend argument for the connector object to true, invoking a launch method, which returns a Virtual Machine (VM) object to the probe program, creating one or more exception requests for suspending the application program when an exception event occurs, creating a notification request for loading of classes and thread deaths, reading a list of loaded classes, and spawning a thread which enters an event retrieval loop; and simultaneously debugging Java code of said application program and one or more native method dynamic load libraries as the application is executing under the Java virtual machine, wherein the Java code is debugged using the Java Platform Debugger Architecture Virtual Machine Debug Interface API and wherein the native method dynamic load libraries are debugged using the system debug API.

15. The computer readable medium as described in claim 14 wherein program code for performing the step of simultaneously debugging the Java code and the native method dynamic load libraries includes program code for providing and displaying a console message window which permits a user to view output printed by the application.

16. The computer readable medium as described in claim 15 wherein program code for performing the step of providing and displaying a console message window includes program code for performing the steps of:

obtaining a Process object from the virtual machine;

obtaining an InputStream object from the Process object, creating a "BufferedReader" object; and using a read method to retrieve data from the application.

17. The computer readable medium as described in claim 14 wherein program code for performing the step of simultaneously debugging the Java code and the native method dynamic load libraries includes program code far providing and displaying a console message window which permits a user to write data to the application.

18. The computer readable medium as described in claim 17 wherein said program code for performing the step of providing and displaying a console message window includes program code for performing the steps of:

obtaining a Process object from the virtual machine;

obtaining an OutputStream object from the Process object, creating a "BufferedWriter" object; and using a write method to write data to the application.

19. The computer readable medium as described in claim 14 wherein program code for performing the step of simultaneously debugging the Java code and the native method dynamic load libraries includes program code for providing the ability to exclude classes when stepping execution by use of an asterisk when invoking an addClassExclusionFilter method on a step request object.

20. The computer readable medium as described in claim 14 wherein program code for performing the step of simultaneously debugging the Java code and the native method dynamic load libraries includes program code for string evaluation with a StringReference interface which extends an ObjectReference such that a string is treated as a class.

21. The computer readable medium as described in claim 14 wherein program code for performing the step of simultaneously debugging the Java code and the native method dynamic load libraries includes program code for modifying symbols such as static and instance fields, strings, array elements, and Booleans, by:

invoking a mirrorOf utility to obtain an access reference to a type of symbol to be modified; and invoking a setValue utility to modify the value of the symbol.

22. The computer readable medium as described in claim 14 wherein program code for performing the step of simultaneously debugging the Java code and the native method dynamic load libraries includes program code for setting a breakpoint by:

obtaining a list of the loaded classes;

obtaining line number information from a class object;

instantiating a breakpoint request (107);

setting the breakpoint request suspend policy; and enabling the breakpoint request.

23. The computer readable medium as described in claim 22 wherein program code for performing the step of setting a breakpoint further comprises program code for adding the breakpoint to a deferred breakpoint table if the class where the breakpoint is to be located is not already loaded.

24. The computer readable medium as described in claim 14 wherein program code for performing the step of simultaneously debugging the Java code and the native method dynamic load libraries includes program code for loading classes by:

obtaining a reference to a method "getSystemClassLoader"; and invoking said method to load a class.

25. The computer readable medium as described in claim 14 wherein program code for performing the step of simultaneously debugging the Java code and the native method dynamic load libraries includes program code for stepping through execution of the application by:

obtaining an event request manager from the virtual machine;

invoking a method of the event request manager to create a new step request including a step size parameter;

enabling the new step request; and resuming the virtual machine.

26. The computer readable medium as described in claim 14 wherein program code for performing the step of simultaneously debugging the lava code and the native method dynamic load libraries includes program code for handling events from the virtual machine by:

providing a plurality of event handlers, one event handler for each requested event object to be processed;

polling a virtual machine event queue to determine if any requested event objects are queued;

removing requested event objects from the event queue;

determining the event object type; and calling an event handler according to the determined event object type.

27. A computer, comprising:

a processor, an operating system having a system debug application programming interface (API);

a Java interpreter having an associated Java Platform Debugger Architecture API for running an application program under a Java Virtual Machine (JVM);

a Java probe means for accessing and controlling an application program being executed by said Java Virtual Machine via said Java Platform Debugger Architecture API; and a debugger engine daemon, communicative to said Java probe, for simultaneously debugging the Java code and native method dynamic load library code in coordination with said probe means, said simultaneous debugging being performed by using a JPDA bootstrap object to obtain a JPDA Virtual Machine Manager, accessing a list of connectors from said Virtual Machine Manager, connecting a probe program to said JVM by iterating through said list of connectors and storing a command line launch abject as a connector object, executing an application program for debug and test under the JVM by setting a main argument for the connector object to the name of said application program, setting a suspend argument for the connector object to true, invoking a launch method, which returns a Virtual Machine (VM) object to the probe program, creating one or more exception requests for suspending the application program when an exception event occurs, creating a notification request for loading of classes and thread deaths, reading a list of loaded classes, and spawning a thread which enters an event retrieval loop, and simultaneously debugging Java code of said application program and one or more native method dynamic load libraries as the application is executing under the java virtual machine.

28. The computer as described in claim 27 wherein the debugger engine daemon is adapted to debug native method dynamic load libraries of the application under the system debug API and the Java probe is adapted to debug Java application code under the Java Platform Debugger Architecture.

29. The computer as described in claim 27 further comprising a console message window means capable of reading data from the application and displaying it to a user, said console message window means comprising:
  a Process object obtained from the virtual machine;
  an InputStream object obtained from the Process object,
  a "BufferedReader" object; and
  a read method adapted to retrieve data from the application and display the retrieved data on a console message window display.

30. The computer as described in claim 27 further comprising a console message window means capable of writing data to the application under user control, said console message window means comprising:
  a Process object obtained from the virtual machine;
  an OutputStream object obtained from the Process object,
  a "BufferedWriter" object; and
  a write method adapted to write data to the application from a console message window display.

31. The computer as described in claim 27 further comprising a class excluder adapted to exclude classes when stepping program execution by use of an asterisk when invoking an "addClassExclusionFilter" method on a step request object.

32. The computer as described in claim 27 further comprising a string evacuator with a StringReference interface which extends an ObjectReference such that a string is treatable as a class.

33. The computer as described in claim 27 further comprising a symbol modifier for modifying symbols such as static and instance fields, strings, array elements, and Booleans, comprising:
  a mirrorOf utility invoker adapted to obtain an access reference to a type of symbol to be modified; and
  a setValue utility invoker adapted to modify the value of the symbol.

34. The computer as described in claim 27 further comprising a breakpoint setter comprising:
  a list of the loaded classes obtained from the virtual machine;
  line number information obtained from a class object;
  a instantiated breakpoint request;
  a breakpoint request suspend policy; and
  a breakpoint request enabler.

35. The computer as described in claim 34 wherein said breakpoint setter further comprises a deferred breakpoint table for storing breakpoints for classes which are not currently loaded.

36. The computer as described in claim 27 further comprising an execution stepper comprising:
  an event request manager obtained from the virtual machine;
  a new step request method invoker for invoking a method of the event request manager to create a new step request including a step size parameter;
  a new step request enabler, and
  a virtual machine resumer.

37. The computer as described in claim 27 further comprising an event handler for handling events from the virtual machine comprising:
  a plurality of event type handlers, one event type handler for each requested event object type to be processed;
  an event queue poller for polling the virtual machine to determine if any requested event objects are queued; and
  an event type handler sorter for determining the event object type and calling an event type handler.

* * * * *

UNITED STATES PATENT AND TRADEMARK OFFICE
CERTIFICATE OF CORRECTION

PATENT NO. : 6,826,746 B2
DATED : November 30, 2004
INVENTOR(S) : David H. Evans et al.

It is certified that error appears in the above-identified patent and that said Letters Patent is hereby corrected as shown below:

Title page,
Item [56], References Cited, U.S. PATENT DOCUEMNTS, The Incorporation by Reference, insert -- United States Patent Number 5,901,315 issued to Jonathan W. Edwards, David H. Evans, and Michael G. Vassil, on My 4. 1999, is hereby incorporated by reference in its entirety, including description and diagrams. --

Column 4,
Line 6, of the specifications, change "mu" to -- run --.

Column 16,
Line 2, change "evaculator" to -- evaluator --.

Signed and Sealed this

Eighth Day of March, 2005

JON W. DUDAS
*Director of the United States Patent and Trademark Office*